(12) United States Patent
Bhupalam et al.

(10) Patent No.: US 8,134,915 B2
(45) Date of Patent: Mar. 13, 2012

(54) METHOD AND APPARATUS FOR PROVIDING NETWORK REDUNDANCY

(75) Inventors: Bhaskar Bhupalam, Santa Clara, CA (US); Michael Shannon, San Jose, CA (US); Anand Oswal, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 609 days.

(21) Appl. No.: 11/954,336

(22) Filed: Dec. 12, 2007

(65) Prior Publication Data

US 2009/0154341 A1   Jun. 18, 2009

(51) Int. Cl.
*H04J 1/16* (2006.01)

(52) U.S. Cl. ......... 370/216; 370/217; 370/218; 370/221

(58) Field of Classification Search .............. 370/216, 370/217, 218, 219, 220, 221, 222, 223, 224, 370/225, 226, 227, 228, 242, 244, 245, 252, 370/254, 351, 389, 400, 401, 405; 714/4, 714/5, 6, 13, E11.08, E11.11; 709/238
See application file for complete search history.

(56) References Cited

U.S. PATENT DOCUMENTS

| 6,487,605 | B1 | 11/2002 | Leung | 709/245 |
|---|---|---|---|---|
| 6,856,591 | B1 * | 2/2005 | Ma et al. | 370/216 |
| 6,910,148 | B1 * | 6/2005 | Ho et al. | 714/4 |
| 7,136,931 | B2 * | 11/2006 | Natarajan et al. | 709/238 |
| 7,139,926 | B1 * | 11/2006 | Madhav et al. | 714/4 |
| 7,152,179 | B1 * | 12/2006 | Critchfield | 714/4 |
| 7,227,838 | B1 * | 6/2007 | O'Riordan | 370/219 |
| 7,227,863 | B1 | 6/2007 | Leung et al. | 370/390 |
| 2004/0076160 | A1 * | 4/2004 | Phaltankar | 370/395.1 |
| 2005/0169284 | A1 * | 8/2005 | Natarajan | 370/401 |
| 2006/0280117 | A1 * | 12/2006 | Gopinadhan et al. | 370/216 |
| 2007/0008880 | A1 * | 1/2007 | Buchko et al. | 370/218 |
| 2007/0094659 | A1 * | 4/2007 | Singh et al. | 718/1 |
| 2007/0220323 | A1 * | 9/2007 | Nagata | 714/13 |
| 2007/0226214 | A1 * | 9/2007 | Smits | 707/7 |
| 2007/0245167 | A1 * | 10/2007 | De La Cruz et al. | 714/4 |
| 2008/0016386 | A1 * | 1/2008 | Dror et al. | 714/4 |
| 2008/0133963 | A1 * | 6/2008 | Katano et al. | 714/4 |
| 2008/0151882 | A1 * | 6/2008 | Sanjay et al. | 370/389 |
| 2008/0288656 | A1 * | 11/2008 | Forrester | 709/238 |
| 2008/0294933 | A1 * | 11/2008 | Nishii et al. | 714/5 |
| 2009/0109869 | A1 * | 4/2009 | Hsiao et al. | 370/254 |

* cited by examiner

*Primary Examiner* — Aung S Moe
*Assistant Examiner* — Abdullah Riyami
(74) *Attorney, Agent, or Firm* — Baker Botts L.L.P.

(57) ABSTRACT

According to one embodiment, providing network redundancy includes configuring a session registrant database to have one or more virtual standby states. Each virtual standby state corresponds to an active router. The session registrant database receives session information from the active router(s) and determines that an active router has failed. A virtual standby state corresponding to the failed router is set to a virtual active state. A second router is configured to have a standby state associated with the set virtual active state. The session information received from the failed router is transferred to the second router, and the second router is configured to have an active state.

18 Claims, 2 Drawing Sheets

METHOD AND APPARATUS FOR PROVIDING NETWORK REDUNDANCY

TECHNICAL FIELD

The present disclosure relates generally to communication networks.

BACKGROUND

Service provider systems typically use redundancy mechanisms to improve reliability. Protocols, such as Hot Standby Router Protocol (HSRP), can be used in a redundancy mechanism in which each active router has a standby router. A host uses an active router. If the active router fails, the standby router takes over and connectivity is maintained. Such 1:1 active-to-standby redundancy mechanisms, however, may be inefficient in certain situations.

BRIEF DESCRIPTION OF THE DRAWINGS

For a more complete understanding of the present disclosure and its advantages, reference is now made to the following description, taken in conjunction with the accompanying drawings, in which.

DESCRIPTION OF EXAMPLE EMBODIMENTS

Overview

According to one embodiment, providing network redundancy includes configuring a session registrant database to have one or more virtual standby states. Each virtual standby state corresponds to an active router. The session registrant database receives session information from the active router(s) and determines that an active router has failed. A virtual standby state corresponding to the failed router is set to a virtual active state. A second router is configured to have a standby state associated with the set virtual active state. The session information received from the failed router is transferred to the second router, and the second router is configured to have an active state.

Description

Figure 1A:
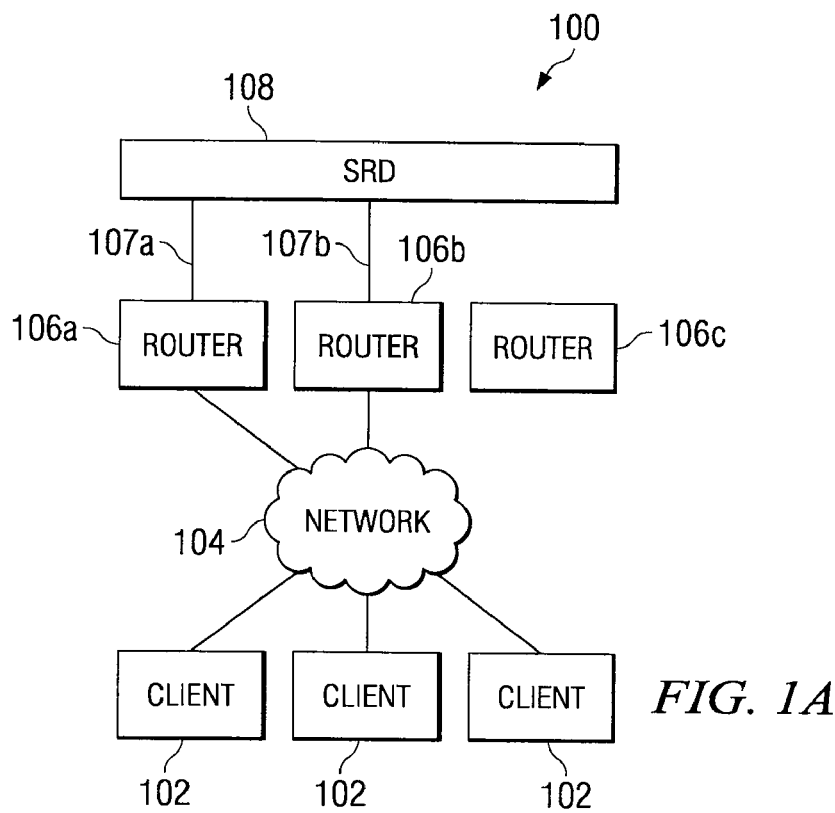
FIGS. 1A and 1B illustrate an example of a portion of a service provider system that includes plural routers and a session registrant database.

FIG. 1A illustrates an example of a portion of a service provider system 100 that generally includes plural clients 102 connected through a network 104 to routers 106. A session registrant database (SRD) 108 is generally operable to provide and manage virtual redundancy backups for active communication session(s), as explained further below. System 100 is generally capable of supporting communication for a client 102 in the event that a router 106 used by client 102 fails. In certain circumstances, another router 106 may be used to maintain connectivity so client 102 may receive continuous service.

In one embodiment, session registrant database 108 provides virtual redundancy backups for plural routers 106, thereby enabling any of a variety of router redundancy ratios. The session registrant database 108 may thus provide non-disruptive communication in a service provider system 100. Particular examples specified throughout this document are intended for example purposes only, and are not intended to limit the scope of the present disclosure. In particular, this document is not intended to be limited to a particular redundancy protocol, such as, Hot Standby Router Protocol (HSRP).

In the example embodiment, clients 102 generally refer to any suitable device operable to communicate with routers 106 through network 104. A particular communication involving a client 102 and a router 106 is referred to herein as a session. Client 102 may include, for example, a cellular telephone, a mobile handset, a personal digital assistant, a computer such as a desktop or laptop, or any other suitable device operable to communicate with routers 106 through network 104.

In the example embodiment, network 104 generally refers to any interconnecting system capable of transmitting information packets. The type of information communicated in an information packet may include audio, video, data, signaling, other suitable signals, or any combination of the preceding. Network 104 may comprise, for example, all or a portion of a cellular telephone network, a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

In the example embodiment, routers 106 generally refer to any suitable device operable to receive information and forward the information to appropriate destinations, such as, for example, to session registrant database 108. The information typically corresponds to a session of client 102. In operation, each router 106 typically handles multiple sessions simultaneously.

Routers 106 may have any of a number of states, including, for example, an active state, a standby state, a listen state, and/or an unassigned state. A router 106 in an active state (an "active router") is actively engaged in receiving and forwarding information, including, for example, information corresponding to the session(s). A router 106 in a standby state (a "standby router") replaces the functionality of an active router that has failed. A standby router is typically assigned to a particular active router 106. A router 106 in a listen state (a "listening router") listens for instructions to assume another state. A router 106 in an unassigned state (an "unassigned router") is not assigned an active, standby, or listening state. As illustrated in FIG. 1A, routers 106a and 106b are in active states, while router 106c is in a listen state. Routers 106 may transition between states in response to receiving appropriate control signals.

In the example embodiment, session registrant database 108 is generally operable to communicate with routers 106 to manage router 106 state assignments. In addition, session registrant database 108 provides virtual redundancy backups by assuming virtual states corresponding to routers 106. For example, session registrant database 108 may assume any number of virtual standby states corresponding to a respective number of active routers 106 by sending signals indicative of a router 106 in a standby state.

Additionally, session registrant database 108 may assume any number of virtual active states by communicating signals that set particular routers 106 in corresponding standby states. In this manner, some embodiments may be compatible with existing hardware, software, and communication protocols of conventional 1:1 router 106 redundancy systems based on Hot Standby Router Protocol (HSRP). In some embodiments, session registrant database 108 may assume a virtual active or a virtual standby state without assuming or having the full functionality of typical routers 106. For example, session registrant database 108 may assume a virtual active state only temporarily without actually communicating with clients 102.

The virtual states of session registrant database 108 may enable any suitable redundancy ratio M:N, which represents the ratio of M active routers to N standby routers. The M and N values may or may not be equal. For example, some embodiments may have 1:1 redundancy ratios, and other embodiments may have M:N redundancy ratios where M is greater than or less than N. In various embodiments, the M:N redundancy capability may be achieved with minimum implementation costs. Additionally, the session registrant database 108 may be generic and reusable with any type of entities supporting 1:1 redundancy.

As shown in FIG. 1A, session registrant database 108 acts as a standby router for active routers 106a and 106b, and communicates with routers 106a and 106b along paths 107a and 107b, respectively. In addition, session registrant database 108 may receive and store session information from routers 106a and 106b for the session(s) facilitated by routers 106a and 106b. Router 106c is in a listen state.

Figure 1B:
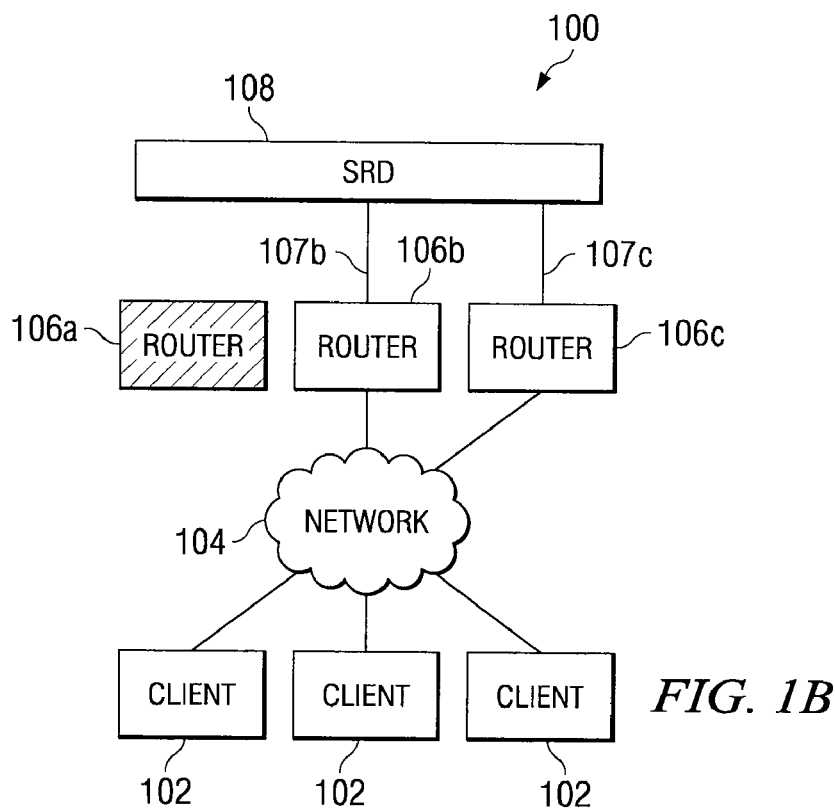

In FIG. 1B, session registrant database 108 detects a failure of router 106a. For example, router 106a may cease to send hello messages along path 107a. In response, session registrant database 108 assumes a virtual active state and selects router 106c to act as a standby router. Session registrant database 108 communicates a signal to router 106c along path 107c that reconfigures router 106c from a listening state to a standby state. In various embodiments, session registrant database 108 may select router 106c from among a plurality of listening routers 106.

Session registrant database 108 may then access the stored state and session information for the session(s) facilitated by router 106a, and transfer the information to router 106c along path 107c. In some embodiments, the transfer of information may take place during a synchronization interval, which may be one to thirty seconds. After the synchronization interval, session registrant database 108 may send a resign signal to router 106c that configures router 106c from a standby state to an active state. Session registrant database 108 may also reconfigure itself to have a standby state for the particular session(s) now associated with active router 106c. Accordingly, router 106c starts sending redundancy state and session information to session registrant database 108.

Router 106a may resolve its failure during the synchronization interval and come back online. To ensure router 106a does not reassume an active state for the session(s) during the synchronization interval, session registrant database 108 may use a delay before configuring the state of router 106a to, for example, a listen state. After the delay, router 106a may enter a listen state after recognizing router 106c is in an active state and the session registrant database 108 is in a virtual standby state for the reconfigured session(s).

Modifications, additions, or omissions may be made to service provider system 100 without departing from the scope of the invention. The components of service provider system 100 may be integrated or separated. For example, session registrant database 108 may include the complete functionality of one or more routers 106. Moreover, the operations of service provider system 100 may be performed by more, fewer, or other components. For example, the operations of routers 106a and 106b may be performed by one component, or the operations of routers 106c may be performed by more than one component. Additionally, operations of service provider system 100 may be performed using any suitable logic comprising software, hardware, other logic, or any suitable combination of the preceding. As used in this document, "each" refers to each member of a set or each member of a subset of a set.

Figure 2:
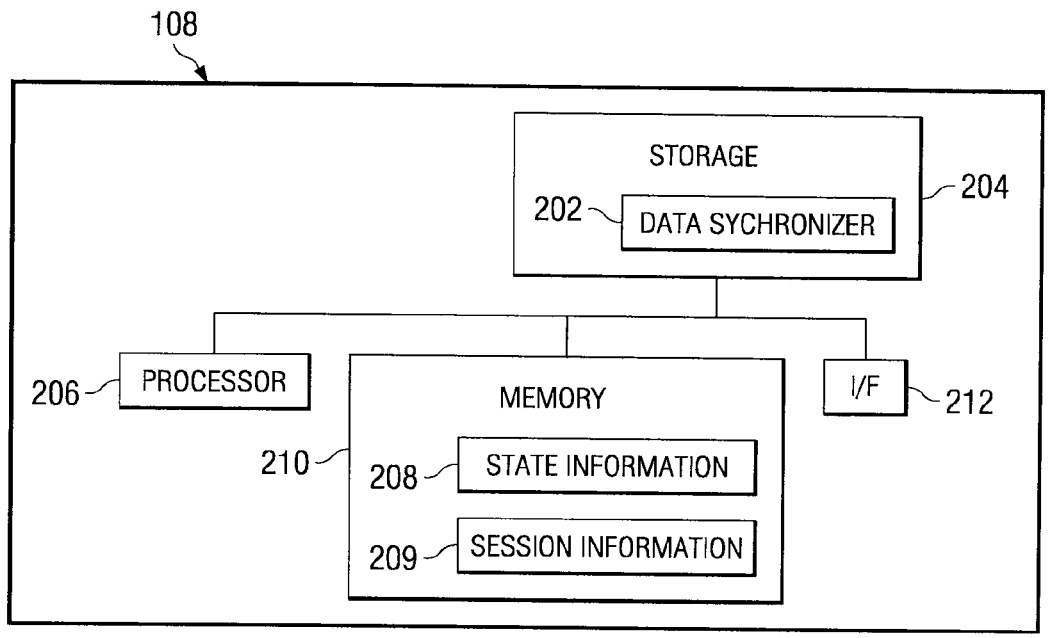
FIG. 2 illustrates an example of a portion of the session registrant database of FIG. 1A.

FIG. 2 illustrates an example of a portion of the session registrant database 108 of FIG. 1A. Session registrant database generally includes storage 204, a processor 206, memory 210, and an interface 212. Processor 206 may refer to any suitable device operable to execute instructions and manipulate data to perform operations for session registrant database 108. Processor 206 may include, for example, any type of central processing unit (CPU). Interface 212 may refer to any suitable device operable to receive input, send output, perform suitable processing of the input or output or both, communicate to other devices, or any combination of the preceding. Interface 212 may include one or more ports, conversion software, or both.

In the example embodiment, a data synchronizer application 202 residing in storage 204 is generally capable of managing the session(s) of clients 102. For example, data synchronizer application 202 may manage router 106 states, virtual states of the session registrant database 108, and/or information synchronization for the session(s). In certain circumstances, data synchronizer application 202 may enable a virtual router 106 to maintain connectivity with clients 102 in the event that a router 106 fails.

Memory 210 may be used to store state information 208 and session information 209 received from routers 106. In the example embodiment, the state information describes the state of a particular session, such as whether a session has been created, updated, or terminated. A session entry may be created when a client 102 requests a new session. A session may be deleted when session registrant database 108 receives a signal indicating the client 102 requested to terminate a session.

Session information 209 includes data associated with a particular session. For example, session information may include a portion of a data stream communicated by client 102 to an active router 106. In the event of a router 106 failure, session registrant database 108 synchronizes session information 209 to another router 106 so that client 102 may have non-disruptive communication.

Modifications, additions, or omissions may be made to session registrant database 108 without departing from the scope of the invention. The components of session registrant database 108 may be integrated or separated. For example, processor 206 may reside separate from session registrant database 108. In some embodiments, processor 206 may perform the functions of data synchronizer application 202. Moreover, the operations of service provider system 100 may be performed by more, fewer, or other components. For example, the operations of memory 210 and storage 204 may be performed by one component, or the operations of processor 206 may be performed by more than one component. Additionally, operations of session registrant database 108 may be performed using any suitable logic comprising software, hardware, other logic, or any suitable combination of the preceding.

Figure 3:
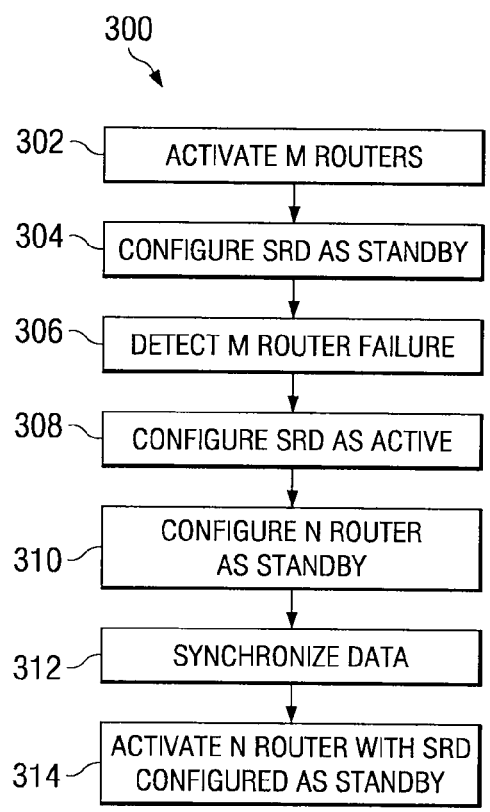
FIG. 3 illustrates an example of acts related to maintaining session connectivity for the system of FIG. 1A in the event of router failure.

FIG. 3 is a flow chart 300 illustrating acts related to maintaining session connectivity for the system 100 of FIG. 1A in the event of router 106 failure. Flow chart 300 begins at block 302, where M router(s) 106 are activated.

The session registrant database 108 is configured to have one or more virtual standby states at block 304. Each virtual standby state corresponds to at least one of the M active states router(s) 106. Additionally, at block 304, the session registrant database 108 receives state and session information from the M router(s) 106, which the session registrant database 108 may store in memory 210.

Session registrant database 108 determines that a router 106 has failed at block 306. For example, session registrant database 108 may detect a failure the router 106 ceases to send hello messages. Session registrant database 108 sets a virtual standby state corresponding to the failed router to a virtual active state at block 308.

At block 310, session registrant database 108 selects a router 106 from among N listening routers 106. Session registrant database 108 configures the selected router 106 in a standby state for the virtual active state.

At block 312, session registrant database 108 synchronizes the information previously received from the failed router 106 and the selected router 106. For example, session registrant database 108 may transfer the session information 209 previously received from the failed router 106 to the selected router 106 having a standby state. A delay may occur at block 312, during which time the failed router 106 is not assigned an active state even if it should come back online.

Once the synchronization is complete, session registrant database 108 configures the selected router 106 to have an active state at block 314. For example, session registrant database 108 may send a resign signal to the selected router 106. Also, at block 314, session registrant database 108 is reconfigured to have a virtual standby state corresponding to the active router 106. Accordingly, the active router 106 sends redundancy state information 208 and session information 209 to session registrant database 108.

Modifications, additions, or omissions may be made to the method without departing from the scope of the invention. The method may include more, fewer, or other steps. For example, the steps at blocks 308 and 310 may be performed substantially simultaneously by sending an appropriate signal from the session registrant database 108 to a listening router 106. Additionally, steps may be performed in any suitable order. For example, in various embodiments the session registrant database 108 may set a virtual standby state corresponding to an active router 106 to a virtual active state, prior to a failure of the active router 106. In some such embodiments, the virtual state change may occur when the active router 106 changes from an active state to some other state.

Technical advantages of some embodiments of the disclosure may include a session registrant database that provides virtual redundancy backups for plural routers, thereby enabling any of a variety of router redundancy ratios. The session registrant database may thus provide non-disruptive communication in a service provider system. In various embodiments, this variable redundancy capability may be achieved with minimum implementation costs. Some embodiments may be compatible with existing hardware, software, and communication protocols of conventional 1:1 redundancy systems based on Hot Standby Router Protocol (HSRP).

Other technical advantages of the present disclosure will be readily apparent to one skilled in the art from the figures, descriptions, and claims. Moreover, while specific advantages have been enumerated above, various embodiments may include all, some, or none of the enumerated advantages.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method, comprising:
 configuring a session registrant database to have a plurality of virtual standby states, each virtual standby state corresponding to a respective one of a plurality of first physical router devices, each first physical router device configured to have an active state;
 receiving, by the session registrant database, information from each of the plurality of first physical router devices;
 determining that a first physical router device of the plurality of first physical router devices has failed;
 setting the virtual standby state corresponding to the failed first physical router device to a virtual active state;
 configuring a second physical router device of one or more second physical router devices to have a standby state associated with the set virtual active state;
 transferring the information received from the failed first physical router device to the second physical router device; and
 configuring the second physical router device to have an active state.

2. The method of claim 1, further comprising:
 configuring the session registrant database to have a virtual standby state corresponding to the second physical router device.

3. The method of claim 1, wherein configuring the second physical router device to have an active state further comprises:
 sending a resign signal from the session registrant database to the second physical router device.

4. The method of claim 1, wherein transferring the information received from the failed first physical router device to the second physical router device further comprises:
 transferring the information during a synchronization interval.

5. The method of claim 1, wherein the number of the plurality of first physical router devices configured in an active state does not equal the number of the one or more second physical router devices.

6. The method of claim 1, wherein the information transferred to the second physical router devices comprises state information corresponding to a state of a particular session, the state information selected from the group consisting of:
 session create;
 session update; and
 session delete.

7. The method of claim 1, wherein the information transferred to the second physical router device comprises session information corresponding to a data stream of a particular session.

8. The method of claim 1, further comprising:
 configuring the first physical router device after a delay.

9. The method of claim 1, further comprising:
 configuring the first physical router device to have a listen state.

10. An apparatus, comprising:
 a memory operable to store information from each of a plurality of first physical router devices, each first physical router device configured to have an active state; and
 logic instructions embodied in one or more non-transitory computer-readable media, the logic instructions when executed operable to:
 configure a session registrant database to have a plurality of virtual standby states, each virtual standby state corresponding to a respective one of the plurality of first physical router devices;

determine that a first physical router device of the plurality of first physical router devices has failed;

set the virtual standby state corresponding to the failed first physical router device to a virtual active state;

configure a second physical router device of one or more second physical router devices to have a standby state associated with the set virtual active state;

transfer information received from the failed first physical router device to the second physical router device; and configure the second physical router device to have an active state.

11. The apparatus of claim 10, the logic instructions further operable when executed to:

configure the session registrant database to have a virtual standby state corresponding to the second physical router device.

12. The apparatus of claim 10, the logic instructions further operable when executed to:

configure the second physical router device to have an active state by sending a resign signal to the second physical router device.

13. The apparatus of claim 10, the logic instructions further operable when executed to transfer the information received from the failed first physical router device to the second router by:

transferring the information during a synchronization interval.

14. The apparatus of claim 10, wherein the number of the plurality of first physical router devices configured in an active state does not equal the number of the one or more second physical router devices.

15. The apparatus of claim 10, wherein the information transferred to the second physical router device comprises state information corresponding to a state of a particular session, the state information selected from the group consisting of:

session create;
session update; and
session delete.

16. The apparatus of claim 10, wherein the information transferred to the second physical router device comprises session information corresponding to a data stream of a particular session.

17. The apparatus of claim 10, the logic instructions further operable when executed to:

configure the first physical router device after a delay.

18. The apparatus of claim 10, the logic instructions further operable when executed to:

configure the first physical router device to have a listen state.

* * * * *